United States Patent Office 3,825,514
Patented July 23, 1974

---

3,825,514
FILM FORMING HYDROPHILIC AMIDE
POLYMER COMPOSITIONS
Raymond L. Drury, Jr., James W. Hines, and Charles S. Nevin, Decatur, Ill., assignors to A. E. Staley Manufacturing Company, Decatur, Ill.
No Drawing. Filed Oct. 12, 1971, Ser. No. 188,587
Int. Cl. C08f 29/46, 45/67
U.S. Cl. 260—29.6 TA          31 Claims

ABSTRACT OF THE DISCLOSURE

Hydrophilic amide polymers are obtained by interpolymerizing monomers of an ethylenically unsaturated monocarboxylic acid, ethylenically unsaturated hard monomers of the lower alkyl esters of an acrylic acid and a soft alkyl ester of an alpha, beta-ethylenically unsaturated carboxylic acid and acylating with hydrophilic amines. The polymerized monomeric units are sufficient to provide an average polymer Tg ranging from about 35° to about 45° C. and a weight average molecular size ($\overline{A}w$) of about 500 to 5,000.

BACKGROUND OF THE INVENTION

There is a need for an aqueous vehicle possessing compatibility with a broad spectrum of lipophilic, hydrophilic materials and inert particles such as pigments. Illustrative of such a need are the problems confronting the artisan in the field of flexographic inks.

The components of flexographic inks are generally grouped into three main classifications, a color portion, an additive portion and a fluid portion. The color portion of the ink is comprised of a dye and/or pigment with the additive or modifier portion being utilized to enhance the desired functional characteristics of the fluid portion of the ink. The most important portion of the flexographic ink is the fluid portion (often referred to as the vehicle). The vehicle portion acts as a carrier for the color ingredients and as a binder to affix the color on the printed surface. Modifiers such as waxy components, flattening agents, defoamers, pinhole retarding agents, plasticizers and the like are usually incorporated to improve its printing characteristics.

The composition of the vehicle portion determines the adhesive properties, flow and tack characteristics, evaporative rate, penetration, gloss and other essential characteristics of the ink. In general, the vehicle portion is comprised of synthetic or natural resins dispersed in a volatile carrier. The most commonly used flexographic inks are generally classified as alcohol, water, polyamide and acrylic inks. With the exception of the water inks, flexographic inks most commonly utilize an organic solvent (e.g., ethanol, hydrocarbons, alkyl acetates) to maintain the resinous portion in solution.

Aqueous based vehicles suitable for use in flexographic ink compositions have been sought as a replacement. Unfortunately, aqueous vehicles have heretofore been unsatisfactory. Typical problems encountered with the aqueous based vehicles include poor gloss, inferior film hardness and/or brittleness, poor dispersibility (especially at high resin levels), incompatibility with polar diluents and dissimilar binders, and/or color imparting agents. In addition, the aqueous vehicles have not been sufficiently stable against separation and viscosity changes especially when stored over prolonged periods. The wet and dry scuff resistance, ink transfer properties and compatibility with lipophilic modifiers also leave much to be desired.

OBJECTS

An object of the present invention is to provide an improved hydrophilic film forming polymer.

Another object of the invention is to provide a polymer which is stable against separation in aqueous mediums over a relatively broad pH and temperature range.

A further object of the invention is to provide a homogeneous aqueous medium having a high concentration of a film forming polymer therein.

An additional object of the invention is to provide a film forming polymer which in the absence of a plasticizer possesses improved hardness and non-brittleness.

A still further object of the invention is to provide a polymer exhibiting improved compatibility with polar, lipophilic diluents and other resins.

Another object of the invention is to provide a polymer exhibiting an improved compatible with a broad spectrum of inorganic and organic pigments.

An additional object of the present invention is to provide improved aqueous based color imparting formulations.

GENERAL DESCRIPTION OF THE INVENTION

According to the present invention, there is provided a hydrophilic amide polymer, adapted to homogeneously disperse in aqueous mediums at a basic pH, comprising a linear polymeric chain of polymerized monomeric units and hydrophilic amide moieties contiguously attached to said polymeric chain, said polymer chain consisting essentially of polymerized units of:

(A) from about 5 to 20 parts by weight of a monoethylenically unsaturated monocarboxylic acid having from 3 to 12 carbon atoms inclusive, (B) a hard monomer of an alkyl ester of a lower alkyl acrylic acid in an amount ranging from about 50 to 100 parts by weight with the alkyl ester and lower alkyl groups having from 1 to 3 carbon atoms inclusive, (C) a hundred parts by weight of a soft alkyl ester of an alpha, beta-ethylenically unsaturated monocarboxylic acid wherein the alkyl esters have from 1 to 3 carbon atoms inclusive, with the proportion of monomers (A), (B) and (C) providing an average polymer Tg ranging from 35 to about 45° C. and a weight-average molecular size (i.e., $\overline{A}_w$) of the polymeric chain being within the range of at least 500 to less than 5,000, said polymer being further characterized as containing a sufficient amount of hydrophilic amide moieties to provide a homogeneous, aqueous mixture as evidenced by a centrifuged polymer residue of less than 0.01 parts by weight when an aqueous medium comprised of 37 parts by weight of hydrophilic polymer and 63 parts by weight water maintained at 25° and a pH between 7.3 and 8.1 is subjected to a centrifugal force of 35 g's for 60 minutes.

The water soluble polymers of the present invention are generally represented by the formula:

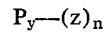

wherein P represents interpolymerized monomeric units A, B and C in the proportion defined herein, y is an integer of a sufficient quantum to provide a polymer having a weight-average molecular size within the range of at least 500 to less than 5,000, Z represents hydrophilic amide substituent and n is an integer of a sufficient number to impart water soluble characteristics thereto.

The hydrophilic organic amide substituents necessary to impart the desired water soluble properties will depend primarily upon the hydrophilic character of the amide and the molecular weight of the polymeric chain. In general, the n value (i.e., the degree of amide substitution) will vary depending upon the amide hydrophilic character and the polymer's molecular weight of the polymer chain. The higher molecular weight polymeric chains require more hydrophilic amide substituents (e.g., degree of substitution or hydrophilic amide character) than those of a lower molecular weight. Since the polymeric chain contains approximately 2.5 but less than 15% by weight polymerized carboxylic acid units, the maximum and minimum number of possible amide substituents is necessarily limited thereby.

HYDROPHILIC AMIDE POLYMER PROPERTIES

The low polymer molecular weight (as evidenced by their low $\overline{A}_w$) and hydrophilic amide moieties makes the polymers particularly suitable for use in aqueous mediums at basic pH's. In weak base aqueous mediums, the polymers exhibit unexpectedly superior stability and resistance to separation. In aqueous mediums of high solids content (e.g., inert pigments, etc.), the hydrophilic polymers facilitate and maintain uniform solids distribution even when exposed to conditions highly conducive to solids separation.

The polymers exhibit an improved ease of application. Aqueous ammoniacal formulations containing the polymers exhibit excellent wet rub resistance and improved dry scuff resistance. Aqueous vehicles containing the polymer deposited upon a suitable substrate dry rapidly and evenly without a concomitant development of undesirable pinholes. Dried films therefrom are hard and not brittle and do not necessitate a plasticizer.

The hydrophilic amide polymers possess a broad spectrum of compatibility with diverse ingredients such as commonly used in printing inks. The polymers also possess sufficient lipophilic characteristics to be compatible with lipophlilic adjuncts. Unlike polymeric emulsions, the polymers are compatible with water miscible oxygenated organic solvents (e.g., dioxane, lower alkanols, etc.).

The polymers are particularly useful as a vehicle binder component in color imparting and/or coating compositions. Initial dispersion, stability and uniform distribution of dyes and pigments are enhanced by employing aqueous basic mediums containing the polymers of the present invention. Aqueous formulations containing the hydrophilic amide polymer exhibit stability against separation and viscosity changes upon aging. The polymers also exhibit sufficient fluidity to qualify for use as a resinous printing ink binder with the tack properties being easily adjusted to the desired level for printing. The polymer enables formulators to employ a higher pigment loading and binder solids level within a useable viscosity range. The hydrophilic polymers have sufficient tack or adhesive properties to be carried by the resilient printing member and deposited upon the desired substrate. The polymers have a low acid number as evidenced by relatively low proportion of interpolymerized carboxylic acid units. The low acid number of the polymer enhances its functionality with pigments which are normally reactive with resins having a higher acid number (e.g., metallic and fluorescent pigments react with high acid number resins which in turn destroy their functionality).

The polymers can also be used as protective coatings for substrates such as metals, plastics and cellulosic materials. Overprint varnish formulations containing the polymers herein exhibit unexpectedly superior solvent release and mar resistance characteristics.

INTERPOLYMER COMPOSITION

The polymeric chain consists essentially of polymerized monomeric units of a monoethylenically unsaturated monocarboxylic acid, an ethylenically unsaturated hard monomer and a soft alkyl ester of an alpha, beta-ethylenically unsaturated monocarboxylic acid. The proportions of monomers utilized in preparing the polymer is such that the average glass transition (i.e., Tg) temperature is within the range of about 35° C. to about 45° C. Polymers having a Tg less than about 35° C. lack sufficient hardness and film strength. Polymers having a Tg greater than about 45° C. possess sufficient hardness but are undesirably brittle.

The weight-average molecular size of the polymers (i.e., before acylation thereof with the hydrophilic amine) is at least 500 but less than 5,000. Polymers having $\overline{A}_w$ in excess of 5,000 cannot be effectively modified with the hydrophilic amide moieties to impart a sufficient degree of stability and solubility in aqueous mediums. Polymers prepared from polymerized monomeric units of less than a 500 $\overline{A}_w$ possess insufficient film forming properties.

The molecular weight distribution of the polymer composition is also an important factor in providing the polymers of the present invention. In general, the polymeric chain has an $\overline{A}_w$ to $\overline{A}_n$ ratio (i.e., weight-average molecular weight size to number-average molecular size ratio) ranging from 1:1 to 3:1. Unexpectedly superior results being achieved when the polymer has an $\overline{A}_w$ to $\overline{A}_n$ ratio ranges between 3:2 to 5:2 and the $\overline{A}_w$ is less than 2,500. The $\overline{A}_w$ and $\overline{A}_n$ characteristics are effectively controlled by polymerizing the monomer units in conjunction with an appropriate amount of a chain terminator.

The polymeric chain contains from about 5 to 20 parts by weight of a monoethylenically unsaturated monocarboxylic acid having from 3 to 12 carbon atoms inclusive. The interpolymerized carboxylic acid monomer units serve as acylation sites for the amines which in turn impart the desired hydrophilic character to the polymers in aqueous mediums at basic pH's. Illustrative monocarboxylic acids include the methacrylic, ethacrylic, i-propacrylic, n-propacrylic, n-butacrylic, t-butacrylic, 2-butacrylic, i-butacrylic, n-hexacrylic and 2-ethyl-hexacrylic acids. Hydrophilic amide polymers possessing exceptional properties are obtained when the alpha, beta-ethylenically unsaturated acid is an acrylic acid having a lower alkyl group from 1 to 3 carbon atoms inclusive (e.g., methacrylic, ethacrylic and propacrylic acid). When the polymeric chain is comprised of from about 10 to about 15 parts by weight interpolymerized unsaturated carboxylic acid moieties, amide polymers exhibiting exceptional coating, hydrophilic and film forming properties are obtained. Interpolymerized polymers containing from about 10 to about 15 parts by weight acid moieties have a sufficiently low acid number to be useful with acid sensitive pigments such as the metallic and fluorescent pigments without adversely effecting its compatibility with lipophilic film formers and aqueous polar solvents which are frequently used to disperse lipophilic materials in aqueous mediums.

The polymeric chain also contains interpolymerized units of an acrylate hard monomer. The polymerized acrylate monomer raises the Tg and contributes to film hardness. The hard monomers are generally characterized as the alkyl esters of acrylic acid and the lower alkyl acrylic acids which form homopolymers having an average Tg of least 80° C. to about 120° C. and particularly those having an average Tg greater than 100° C. Exemplary hard monomers are methyl methacrylate, propyl methacrylate, tert-butyl methacrylate, cyclohexyl acrylate dimethyl itaconate, dimethyl maleate, mixtures thereof and the like. Depending upon the average polymer Tg of the other polymerized monomeric units, the amount of the hard monomer component broadly ranges from about 50 to about 100 parts by weight. Methyl methacrylate has been found to be particularly well suited in providing the water soluble polymers of the present invention. The polymers containing methyl methacrylate as the major polymerized hard monomer component (preferably the hard monomer is comprised of more than 90% or substantially all methyl methacrylate) exhibit exceptional hydrophilic properties. Significantly improved functionality is achieved when the hard monomer component comprises from about 65 to about 85 parts by weight of the total polymeric chain molecular weight. The polymerized hard acrylic monomers impart scuff resistance to films prepared from the hydrophilic amide polymers herein.

The third essential polymerized monomeric unit of the polymeric chain is a soft alkyl ester of an alpha, beta-ethylenically unsaturated monocarboxylic acid. Normally the average $Tg$ of the soft alkyl esters used herein have homopolymer $Tg$ of less than 20° C. and most generally within the range of about 10° C. to about −100° C. The soft alkyl ester is usually the principal polymerized monomeric constituent of the polymeric chain. The polymerized monomeric units of the soft alkyl esters in combination with the other monomeric units impart to the resultant polymer the appropriate degree of film flexibility. In general, the soft lower alkyl esters of alpha, beta-ethylenically unsaturated acids (for example, methyl acrylate, ethyl acrylate and propyl acrylate) improve both the rate of solubility and stability of the polymer in aqueous mediums. Soft alkyl esters having alkyl ester groups of 4 or more carbon atoms have been found to adversely effect the desired properties.

POLYMERIZATION CONDITIONS

The polymerized monomeric units comprising the polymeric chain are prepared by conventional emulsion polymerization techniques employing the appropriate monomeric concentrations and process conditions to provide a polymer having an $\overline{A}_w$ of at least 500 but less than 5,000.

A wide variety of nonionic surface active agents and anionic surface active agents may be used to prepare the polymeric emulsions. Normally, the surface active agents used in preparing the polymeric chains are the same as utilized by the art in emulsion polymerization. Suitable nonionic surface active agents are those generally composed of a hydrophobic hydrocarbon portion and a hydrophilic portion particularly those nonionic surface active agents having a substantial number of oxyethylene groups. Alkylphenoxypolyoxyethylene which is comprised of 2–120 oxyethylene units with an alkyl group of 4–18 carbon atoms linking the oxyethylene chain through a phenoxy group is an exemplary nonionic surface active agent. Anionic surfact active agents are preferably included in the polymerization emulsion. Illustrative anionic surface active agents are the ammonium or alkali metal (e.g., sodium) salts of alkyl (e.g., lauryl) ether sulfates, the ammonium or alkali metal salts of alkyl phenoxy polyoxyethylene ethanol sulfate esters (and similar polyoxyethylene derivatives) the tetra sodium salt of N-(1,2-dicarboxyethyl N-octadecyl sulfosuccinamate (Aerosol 22), the alkali metal and ammonium salts of polyelectrolytes, sodium alkyl (e.g., lauryl) sulfate, mixtures thereof and the like.

The amount of surface active agent (or agents) required varies primarily with the concentration of monomers to be handled and to a minor extent with the choice of emulsifier, monomers, proportions of monomers and catalysts. Generally, the amount of surface active agent is between 1% and 12% of the total monomer weight and preferably between 3% and 6%. The proportion of surface active agent should be sufficient to impart the necessary stability, desired rate of polymerization, particle size and degree of polymerizate and uniformity in molecular weight distribution.

As polymerization catalysts, there may be used one or more of the peroxidic compounds better known to act as free-radical catalysts which have at least some solubility in aqueous solutions of the emulsifier or which are soluble only in the monomer phase. Among the useful catalysts are the persulfates including ammonium, sodium and potassium salts, hydrogen peroxide, and the perborates. Also useful are the organic peroxides and hydroperoxides. These include benozyl peroxide, tertiary butyl hydroperoxide, diisopropyl benzene hydroperoxide, cumene hydroperoxide capropyl peroxide, methylethyl ketone peroxide, etc. Other free-radical catalysts are azodiisobutyronitrile and other tertiary aliphatic azo compounds of the type which have an acylic azo group and an aliphatic carbon atom on each nitrogen.

The amount of peroxidic catalysts required is approximately proportional to the concentration of monomers used. The usual range is 0.01% to 3% of catalysts with reference to the weight of the monomer mixture. The preferred range is from 0.10 to 1.0% while the range of 0.4–0.8% is usually best. The optimum amount of catalysts is determined in large part by the nature of the particular monomers selected including impurities which accompany particular monomers.

Frequently, a promoter for the catalysts (sometimes called an "accelerator" or "adjuvant") is used to hasten the reaction at a sufficiently low temperature to avoid coagulation. The promoter may be a reducing agent and together with the peroxidic catalysts is frequently referred to as a "redox system." Many examples of such systems are known and the promoters include ascorbic acid, and soluble sulfites, hydrosulfites, sulfoxalates, thiosulfates and bisulfites. Particular promoters are exemplified by sodium hydrosulfite, sodium metabisulfites, zinc or sodium formaldehyde sulfoxalate, and calcium bisulfite. Polyvalent metal ions are also used in small concentrations, particularly ferrous ion in the form of ferrous ammonium sulfate at concentrations of a few parts of ferrous ion per million.

The amount of promoter required varies, as is known, with the free-radical initiator chosen and with a particular promoter. The emulsifying agent also affects somewhat the amount used as does the particular monomers. At the outside, not more than 3% or less than 0.01% is used in these situations. The preferred range of ascorbic acid is at the low end of this range up to about 0.5% while sulfites are used preferably in an amount of 0.2% to 1%.

The preferred polymerization range is temperatures between 30° and 70° C. After most of the monomers have been converted to the desired polymeric chain, temperatures in excess of 95° C. may then be applied provided substantially all of the monomers have been polymerized. Since polymerization reaction is exothermic, the temperature can be controlled by the rate at which monomers are supplied and polymerized and/or by external cooling. The pH is maintained on the acid side and usually between about 2.5 to about 3.5.

An essential embodiment is to effectively control the polymer's $\overline{A}_w$. Significantly improved results are achieved when the polymerization is conducted under conditions whereby the $\overline{A}_w$ has a value of less than 3,000. Preferably the $\overline{A}_w$ is within the range of about 1,000 to 2,000 and the $\overline{A}_w$ to $\overline{A}_n$ ratio is between about 3:2 and 5:2 (with the best results being achieved at about 2:1). An effective amount of a suitable chain transfer agent (frequently referred to as a chain length terminator or modified) is a suitable means for obtaining the appropriate molecular weight and molecular weight distribution.

Although it is feasible to include a chain terminator (for example, monothioglycerol) as a component within the polymerization reactor with the monomeric units being slowly added thereto, improved results (e.g., molecular weight and homogenity thereof) are achieved when the chain terminator or modifier is admixed with the monomeric units prior to the polymerization thereof. The admixing of from about 0.4 to about 0.6 parts by weight to mercaptoethanol per 100 parts by weight of the polymerizable monomeric units has been found particularly useful

ACYLATION AND pH ADJUSTMENT

The interpolymer having the aforementioned prerequisite composition is then acylated with a hydrophilic amine. As mentioned above, the interpolymer is prepared under emulsion polymerization conditions. Prior to the amine acylation thereof, it is necessary to homogeneously disperse the amine throughout the emulsion without disrupting the emulsified state of the interpolymer. This is generally effectuated by initial admixing the interpolymer emulsion with the hydrophilic amine under conditions sufficient to provide a homogeneous mixture. Mixing conditions resulting in separation or gelling of interpolymer emulsion will adversely affect both the acylation reaction and properties of the resultant amide interpolymer.

The order in which the reactants are admixed, the temperature and pH conditions also affects the properties of the resultant hydrophilic amide polymer. For example, if it is desired to provide a hydrophilic morpholide interpolymer, the morpholine admixing and acylation temperature are important factors in obtaining the desired polymer. Homogeneity of amine and interpolymer emulsion admixture can be accomplished by initial mixing at a temperature of less than 40° C. (e.g., between about 10° C. to about 35° C.). At high amine concentrations and temperatures in excess of 40° C., considerable gelling is encountered. Likewise, neutralization (e.g., with ammonia) of the interpolymer emulsions prior to its acylation or admixing also adversely affects the overall properties of the resultant hydrophilic amide polymer. Homogeneously admixing the acidic interpolymer emulsions directly with the hydrophilic amine without making a pH adjustment has been found to be most satisfactory.

After the hydrophilic amine has been homogeneously dispersed throughout the interpolymer emulsion, the acylation reaction is completed. Acylation temperature in excess of 90° C. should be avoided with the acylation temperature usually being maintained between about 50° C. to about 75° C. for a period of time sufficient to allow the interpolymer carboxylic acid moieties to react with the hydrophilic amine. Temperatures ranging from about 50° C. to about 60° C. with sufficient agitation for about an hour or two are generally sufficient to complete the acylation. Similar to admixing step, the acylation reaction is conducted under acidic conditions employing the interpolymer emulsion.

Appropriate amine reactants and suitable amounts therefore can be readily ascertained by determining the stability of the resultant hydrophilic amide polymers when aqueous base mediums containing the polymers are subjected to centrifugal forces. In general, the hydrophilic amide polymers are characterized as providing less than 0.01 parts by weight centrifuged residue when an aqueous medium containing 37 parts by weight polymer and 63 parts by weight water is adjusted to a pH between 7.3 and 8.1 with ammonia and subjected to centrifugal force of 35 g's at 25° C. for 60 minutes. Stoichiometric amounts of hydrophilic amine or slight excesses thereof are generally sufficient for this purpose.

Illustrative organic amine reactants include those generally represented by at least one member selected from the group of:

(I) 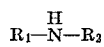

and (II) 

wherein $R_1$ of Formula I is a hydrophilic organic substituent selected from the group consisting of an alkylene group having at least one oxy ether group, an alkylene group having at least one divalent oxygen atom monovalently linked to a corbon atom and the remaining monovalent oxygen linkage thereof being contiguously attached to a nitrogen atom, a lower alkanol group (e.g., $C_1$–$C_6$ alkanols), a polyhydric alcohol, and $R_2$ is either a hydrophilic organic substituent or hydrogen and the amine represented by Formula II being a heterocyclic amine wherein $R_3$ is an alkylene moiety selected from the group consisting of an alkylene moiety having at least one oxy group, and an alkylene moiety containing at least one divalent oxygen atom monovalently linked to a carbon atom and the other monovalent oxygen of said divalent oxygen being contiguously attached to a nitrogen atom.

Formula I includes the primary and secondary amine of the lower molecular weight alkanols, the alkylene glycol polyethers (e.g., polyalkylene oxides such as polyethylene oxide, polypropylene oxide, polybutylene oxide, etc., polyhydric alcohols, the lower alkyl imide esters (e.g., 1–5 carbon atoms inclusive) mixtures thereof and the like. Hydrophilic organic amine reactants represented by Formula I include 3-methoxy propyl amine; 2-amino, 2-methyl, 1-proponal; monoethanol amine; diethanol amine; 2-amino, 1-butanol; 2-amino, 2-ethyl, 1,3 propanediol; 2,amino, 2-methol, 1,3 propandiol; 2-(dimethyl amino)-ethanol;tris (hydroxy-methyl) aminomethane; 2-amino-2-methyl-1,3 propanediol and the like. Morpholine, oxazolidine and isooxazolidine are illustrative amine reactants represented by Formula II.

Homogenity and viscosity characteristics of the amide polymer in aqueous medium is pH dependent. The amide polymer exhibits low dispersibility and viscosity characteristics at acid pH levels. At slightly alkaline pH's (e.g., above 7.0 to less than about 8.5), the hydrophilic and viscosity properties increase significantly. Thus in order to advantageously utilize the inherent functional properties of the amide interpolymer, the aqueous medium containing the acylated polymer is adjusted to a pH of between about 7.4 and 8.5. Any alkaline material may be used provided it does not adversely effect the homogeneous character of the amide polymer. Volatile alkaline agents (e.g., ammonium, ammonical solutions, amines, etc.) are particularly useful in providing those aqueous vehicles which are adapted for application and drying under ambient conditions. When it is desired to increase the amount of hydrophilic amide in the aqueous medium, the appropriate solids concentrations is usually made prior to pH adjustment, especially if a volatile alkaline reagent is used.

HYDROPHILIC AMIDE FORMULATIONS

An important commercial utility of the hydrophilic amide polymer resides in their use as aqueous vehicles in coating and color imparting formulations (e.g., varnishes, inks, paints, etc.). In ink formulations, conventionally comprised of a color imparting portion (e.g., pigments and/or dyes), a vehicle portion (with or without modifiers), the hydrophilic amide polymer of the present invention affords ink formulation of an aqueous vehicle possessing properties analogous to the organic solvent vehicles. In such ink formulations, the hydrophilic amide polymers are suitably combined with water as a principal (on a weight basis) solvent.

The color imparting compositions (including ink formulations) may utilize the hydrophilic amide polymer as the principal film former or alternatively the hydrophilic amide may be used as an auxiliary film former. As an auxiliary film former, a hydrophilic film former can be effectively used as a corrective to achieve the desired overall film forming hardness and/or flexibility.

Due to its lipophilic and hydrophilic properties, the hydrophilic amide polymers are compatible with a broad spectrum of cobinders such as those conventionally used in formulating ink and color imparting compositions. Accordingly, such compositions containing both natural and synthetic resins may be formulated with the hydrophilic amide polymers. Natural resins such as fossil copal, copal, damar, fossil damar, gum elemi, gum mastic, sandarac, shellac, rosin mixtures thereof and the like employed in formulating ink and other color imparting compositions are well known to the art. Similarly, chemical derivatives and synthetic resins such as rosin derivatives, cumarone resins and derivatives thereof, alkyd and polyester resins, cellulose derivatives (e.g., CMC; nitrocellulose; methyl, methyl and benzyl cellulose; cellulose acetate, acetobutyrate and acetopropionate, etc.), chlorinated rubber, polyethylene cyclized rubber, polyolefin mixtures thereof and the like are also frequently used as film formers.

A particular useful application of the hydrophilic amide polymers is in the formulation of coating and color imparting formulations which contain rosin derivatives and particularly those rosins exhibiting solubility in water-miscible, organic, oxygenated solvents. Rosin derivatives are frequently classified by their softening points. Rosin esters derivatives having relatively low softening points (e.g., usually less than 95° C.), frequently referred to as the soft rosins, are the methyl and hydrogenated methyl esters of rosin, ethylene and diethylene glycol esters of rosin, ethylene, triethylene, diethylene glycol hydrogenated esters of rosin, ethylene and diethylene glycol esters of polymerized rosin, glycol esters of rosin and glycerol esters of hydrogenated rosin. Illustrative hard rosin derivatives (e.g., exhibiting softening points above 95° C. and usually between 100° C.–185° C.) include glycerol esters of polymerized rosins, maleic-modified ester gums, pentaerythritol esters of rosin, modified pentaerythritol esters of rosin, etc. Comparatively, the soft rosin derivatives are generally more compatible with a broader spectrum of film formers than the hard rosin derivatives. The hard resin derivatives are generally incompatible with most film formers and possess inherent film brittleness. These adverse properties severely restrict their initial functionality as a film former (e.g., in ink formulations). Since the hydrophilic amide polymers are compatible with the hard rosin derivatives, the hard rosin derivatives can be used in conjunction with hydrophilic amide polymers in coating and color imparting formulations. Dried films prepared from such coating and coloring imparting formulations exhibit significantly improved film hardness without being brittle. Aqueous based coating and/or color imparting formulations containing the rosin derivatives can easily be prepared by employing a water miscible organic solvent in an amount sufficient to stabilize the rosin derivative and maintain the solubilized rosin derivative homogeneously dispersed throughout the aqueous dispersing medium.

The hydropholic polymers herein are particularly suitable in printing ink compositions having a pH of above 7.0 to about 8.0 and comprised primarily of water as a dispersing medium. The relative proportions of the basic aqueous dispersing mediums to water soluble polymer solid content will depend largely upon the particular type of printing inks desired. For example, in formulating a printing ink, the flexographic inks are generally applied at a relatively low viscosity (e.g., 22 to 25 sec. measured by #2 Zahn cup) whereas silk screen inks typically used to print on bottles and other similar containers are of a much higher viscosity (e.g., 2,500 centipoises on a Brookfield viscometer). By increasing or decreasing the water polymers solids concentration, the appropriate fluidity and viscosity of the color imparting composition can be achieved.

The color portion or color imparting compositions compatible with the hydrophilic amide polymers include those coloring agents commonly used in inks, paints, dyes, etc. Thus, the color imparting compositions, employing the hydrophilic amide polymer as a vehicle, includes conventional dyes or pigments as well as mixtures thereof. Illustrative dyes and pigments suitable for use as color imparting agents in aqueous formulations containing the polymers may be found in publications such as "Printing and Litho Inks," sixth and completely revised edition © 1967 by Herbert Jay Wolfe, published by MacNair-Dorland Co., New York, N.Y., Chapters V–IX and in Chapter 2 of a book entitled "Industrial Printing Inks" by Louis M. Lorsen, © 1962, Reinhold Publishing Company. Similarly, further information relative to other additives such as vehicles, solvents, resins and the testing procedures in formulating the desired color imparting compositions may be found in these references and other publications. The inherent dispersing and suspending properties of the hydrophilic polymers in basic aqueous mediums enables formulators to substantially increase the pigment concentrations without adversely affecting the application ease and properties of the resultant dried colored films therefrom. Certain dyes and pigments will (e.g., many of the metallic and fluorescent pigments) react with carboxylic acids and effectively destroy their intended functionality. Due to their relatively low acid number, the hydrophilic amide polymers can be used in conjunction with dyes and pigments which are normally prone to react with resins of a higher acid number.

Unlike conventional emulsion polymers, the hydrophilic amide polymers are generally compatible with water-miscible, organic, oxygenated solvents such as the alcohols (e.g., methyl alcohol, ethyl alcohol, isopropyl alcohol, n-propyl alcohol, secondary butyl alcohol, n-butyl alcohol); the organo ester solvents such as methyl acetate, ethyl acetate, isopropyl aectate, n-propyl acetate, secondary butyl acetate, isobutyl acetate, n-butyl acetate; the glycol ethers such as methyl Cellosolve, butyl Cellosolve; the ketones such as acetone, methyl ethyl ketone, methyl butyl ketone, dioxane mixtures thereof and the like. When organic, water miscible polar solvents are employed in preparing the coating and color imparting compositions, water is employed as the major vehicle solvent with the total amount of organic solvent being preferably less than about 25% by weight of the water.

Since the water-soluble polymers also possess lipophilic characteristics, the organic lipophilic solvents such as the aliphatic naphthas (hexane, heptane, octane, mineral spirits), the aromatic hydrocarbons (benzene, toluene, xylene), the nitroparaffins (such as 2-nitro propane, and the like) can be used, if desired, in minor amounts (e.g., usually less than about 10% by weight of the polar solvent medium weight). Similarly, plasticizers may be employed, if desired, to supplement the inherent plasticizing properties of the hydrophilic amide ploymers.

Further improvements in certain desired film properties (e.g., solvent resistance, tensile strength, heat distortion, hardness, adhesion, etc.), can be accomplished by crosslinking the amide interpolymers. Such crosslinking agents may be incorporated into the aqueous formulation containing the hydrophilic amide polymer or applied after or during its application. Thermoset crosslinking agents as well as those which are reactive under ambient conditions may be employed. Conventional crosslinking agents reactive with nitrogen group containing monomers such as acrylamide, methacrylamide, iminol methacrylate etc. (e.g., those having amido and aziridinyl functional groups) are generally suitable for this purpose. Illustrative crosslinking agents include formaldehyde, hydroxyl urea-formaldehyde, melamine-formaldehyde, epoxy carboxyl, anhydrides, mixtures thereof and the like.

The following examples are merely illustrative and should not be construed as limiting the scope of the invention.

EXAMPLE I

A hydrophilic amide polymer was prepared from the following raw materials:

|  | Item | Raw materials | Parts, as is basis | Percent wet weight basis | Lbs. dry weight per 100 lbs. |
|---|---|---|---|---|---|
| Reactor charge. | 1 | Water | 1,805.0 | 40.1004 | |
| | 2 | "Dupanol WAQE" (29%)[1] | 90.5 | 2.0106 | 0.5831 |
| | 3 | "Tergitol NPX" (100%)[2] | 19.5 | 0.4332 | 0.4332 |
| | 4 | Citric acid monohydrate. | 0.7 | 0.0156 | 0.0143 |
| | 5 | t-Butyl hydroperoxide (70%). | 27.8 | 0.6176 | 0.6176 |
| "A" feed | 6 | Methyl acrylate | 825.0 | 18.3284 | 18.3284 |
| | 7 | Methyl methacrylate | 594.0 | 13.1965 | 13.1965 |
| | 8 | Methacrylic acid | 81.0 | 1.7995 | 1.7995 |
| | 9 | 2-mercaptoethanol | 9.0 | 0.1999 | 0.1999 |
| "B" feed | 10 | Water | 494.0 | 10.9749 | |
| | 11 | Ascorbic acid | 6.1 | 0.1355 | 0.1355 |
| "C" feed | 12 | Water | 50.0 | 1.1108 | |
| | 13 | "Triton X-200" (28%)[3] | 15.0 | 0.3332 | 0.0933 |
| "D" feed, post add. | 14 | Water | 267.8 | 5.9495 | |
| | 15 | Morpholine | 40.2 | 0.8931 | 0.8931 |
| "E" feed, post add. | 16 | Water | 124.4 | 2.7637 | |
| | 17 | Ammonium hydroxide (28%). | 25.1 | 0.5576 | 0.1561 |
| "G" feed, post add. | 18 | Water | 25.0 | 0.5554 | |
| | 19 | "Dowicil 100"[4] | 1.1 | 0.0244 | 0.0244 |
| Totals | | | 4,501.2 | 100.0000 | 36.4749 |

[1] A sodium lauryl sulfate preparation manufactured and distributed by E. I. duPont Co. of Wilmington, Delaware.
[2] Nonyl phenyl polyethylene glycol ether manufactured and distributed by Union Carbide Co., 270 Park Avenue, New York, N.Y.
[3] Octyl phenoxy polyethoxy ethanol by Rohm & Haas Co., Philadelphia, Pa.
[4] Bactericide manufactured and distributed by Dow Chemical Company, Midland, Michigan.

In preparing a polymeric chain having an appropriate Tg molecular weight and molecular weight distribution, a reactor equipped with an agitator was charged with the hot water (75° F.—item 1 above). With moderate agitation, items 2–5 were added in consecutive order to the reactor and the resultant reactor charge was then mixed an additional 10 minutes. The reactor was closed and purged with sufficient nitrogen to displace any residual air. Intermediate "A" Feed and "B" Feed were separately prepared by mixing at 75° F. for 15 minutes respectively items 6–9 and 10–11 in separate holding tanks. From a holding tank, 10% by weight of the "A" Feed was charged to the reactor and the reaction mixture was heated to 140° F. The reactor was then charged with 10% by weight of "B" Feed. Without applying external heat, the ensuing exothermic reaction was allowed to raise the reactants to a temperature of 155° F. After achieving an exothermic temperature of 155° C., the "A" Feed and "B" Feed were simultaneously and continuously charged to the reaction chamber at a constant rate. About 15 minutes after recharging the reactor with "A" and "B" Feeds, the reaction media had achieved an exothermic temperature of about 168° F. By cooling means, the reaction media was then maintained at a temperature of about 168° F. After about 55% of Feed "B" and 67% "A" Feed had been added to the reactor (about an hour after commencing the reaction with Feed "B"), the "C" Feed was initially added to the reaction media at a constant rate such that the total "C" Feed was admitted to reactor at about 60 minutes after the initial charging thereof. The "A" Feed charge was completed about 75 minutes after acheiveing the above mentioned exothermic temperature of 155° F. About 90 minutes after initial achieving of the exothermic temperature of 155° F., the "B" Feed addition was completed. The resultant reaction media was then maintained at about 168° F. with continued agitation for additional sixty minutes. The resultant polymeric emulsion was then cooled to 140° F.

The $\overline{A}_w$ and $\overline{A}_n$ values for the methyl acrylate, methyl methacrylate and methacrylic acid interpolymer were then determined via gel permeation chromatography (GPC) analysis. Samples of the emulsion were air dried to remove substantially all of the solvent and further vacuum oven dried at 40° C. and 30 inches of vacuum for 16 hours. The vacuum dried emulsion samples were then dispersed in tetrahydrofuran at 0.25% by weight solids level by agitating for one hour in 2 oz. bottles with a Burrell wrist action shaker at 25° C. The samples were then filtered through a 0.45 micron filter and subjected to GPC analysis.[1] The GPC was equipped with a series of low molecular size banks [2] of four foot columns (often referred to as sample loops). In the GPC analysis, tetrahydrofuran was used as a solvent, automatically pumped through the column banks at a flow rate of 1 ml. per minute at 25° C. Calibration curves for the GPC were determined using low molecular weight polystyrene standards. The $\overline{A}_n$ (number-average molecular size) and $\overline{A}_w$ (weight-average molecular size) based upon the calibration curve and GPC analysis were then determined.[3] The interpolymer had an $\overline{A}_w$ of 1,015, an $\overline{A}_n$ of 485 and and $\overline{A}_w/\overline{A}_n$ of 2.09.

A hydrophilic morpholide polymer was then prepared from the polymeric chain obtained above by charging to the reaction, the "D" Feed at a rate of about 2.5 lbs./minute. Because of a relatively dilute morpholine aqueous medium and a relatively low rate of addition under sufficient agitation was employed in this example, congealing of the interpolymer was not encountered at the 140° F. hydrophilic amine addition temperature. With continued agitation and maintaining the reaction media at about 140° F., the "D" Feed was allowed to react with the polymeric chain and thereby provide a morpholide interpolymer reaction product (total reaction time was about 120 minutes).

The resultant morpholide polymer was then solubilized by adding to the reactor the "E" Feed at a rate of 2.5 lbs./minute with continued agitation. After completing the addition of the "E" Feed thereto, the hydrophilic morpholide polymer was maintained at 140° F. and mixed an additional 30 minutes. Thereafter the "G" Feed (a bactericide) was immediately charged and uniformly admixed with the resultant hydrophilic morpholide polymer. The pH of the resultant product was about 7.6 and contained a total solids content (36.0% by weight) and polymeric solids of about 34 weight percent. The hydrophilic morpholide polymer had an acid number of 35.

The morpholide interpolymer was a translucent, homogeneous mixture. Viscosity of the freshly prepared aqueous media, as ascertained by a Brookfield Viscometer employing a #2 spindle at 20 r.p.m. and 25° C. was 1,500 cps. Forty-eight hour viscosity measurements at 25° C., indicated a viscosity increase of less than 15%. The resultant aqueous medium retained its homogeneous character, after being stored for 14 days under ambient conditions, without any visible separation of the components therefrom. In order to further test the stability of aqueous mediums, the resultant product was subjected to a centrifugal force. Employing 50 ml. centrifuge vials, 50 ml. of the resultant aqueous medium was subjected to a centrifugal force of 35 $g$'s for 60 minutes at 25° C. Examination of centrifuge vials, containing the centrifuged aqueous medium, failed to reveal any visible centrifuged residue. Ethanol (20% by weight of the water) was admixed to Erlenmeyer flask containing approximately 200 ml. of the aqueous medium without any detectable separation of the polymer therefrom. As evidenced from the ---
[1] Employing a Model GPC-200 manufactured and distributed by Water Associates, Inc., Framingham, Mass.
[2] Columns were packed and distributed by Water Associates, Inc., Framingham, Mass., and sold as "Styragel" $10^5$, $10^4$ and $10^3$ and "Poragel" $10^3$ and 60A.
[3] See Journal of Chemical Education, Vol. 43, Number 8, August 1966 A625–642 and Technical Bulletin #2-2064 "GPC" Water Associates, Framingham, Mass.

aforementioned tests, the hydrophilic morpholide polymer exhibits solute characteristics.

EXAMPLE II

An ink formulation employing the polymer from Example I was prepared. The ink formulation contained the following:

| Ingredients | Parts by weight | |
|---|---|---|
| | Ink A | Ink B |
| Barium Lithol red | 45.0 | 45.0 |
| Example 1 hydrophilic amide polymer (35% by weight solids) | 146.43 | 146.43 |
| Water | 58.57 | 38.57 |
| Polymekon wax #22 (33% solids) | 7.5 | 7.5 |
| Defoamer | 0.25 | 0.25 |
| Ethanol | 0.00 | 20.00 |
| | 257.75 | 257.75 |

The above ink formulations were prepared by ball milling for 16 hours with a pigment to binder ratio being 0.88 to 1.0 and the total formulation containing 18% by weight pigment.

Employing a No. 2 "Zahn cup" viscosity measurements were taken upon the initail ink formulations "A" and "B" and after 17 days aging under ambient conditions. Initial viscosity and 14 day viscosity readings were respectively 20 and 21.2, seconds for ink "A" and 25 to 26.5 seconds for ink "B." Notwithstanding the high level of binder and pigments, the ink formulations "A" and "B" evinced stability against substantial viscosity changes upon aging as evidenced by the above Zahn cup viscosity readings.

For comparative purposes, Inks "C" and "D" were formulated employing comparable weight percentages of rosin ester derivatives and Shellac. Inks "A" and "B" exhibited significantly superior wet and dry rub resistance, viscosity stability on aging, pigment wetting to comparative ink formulations "C" and "D." Printability including flow properties, non-thixotrophic and adherence characteristics indicated Inks A and B were superior over Inks C and D. After application, Inks A and B exhibited a significantly faster set and solvent release properties than Inks C and D. The gloss, film, hardness, non-brittle, film-improvements, color and other characteristics of Inks A and B were markedly superior over those prepared from Inks C and D.

EXAMPLE III

For test purposes, four flexographic inks were prepared utilizing the hydrophilic morpholide polymer aqueous medium prepared in accordance with Example I. Inks E and F illustrate a high performance and high cost flexographic ink formulations. Inks G and H represent good quality and low cost flexographic ink formultions. Using conventional ball milling techniques, the following ingredients and weight percent thereof were employed in preparing flexographic Inks E–H;

| Ingredients | Ink E | Ink F | Ink G | Ink H |
|---|---|---|---|---|
| Pigment: | | | | |
|   Inorganic | 35.0 | | 40.0 | |
|   Organic | | 15.0 | | 15.0 |
| Hydrophilic morpholide polymer: | | | | |
|   (10% solids) | 7.0 | 10.0 | 5.0 | 7.0 |
| Bleached shellac [1] | 7.0 | 10.0 | | |
| Hard rosin ester [2] | | | 12.0 | 13.0 |
| Dry wax | 1.0 | 1.0 | 1.5 | 1.5 |
| Defoamer | 0.1 | 0.1 | 0.1 | 0.1 |
| Butyl cellosolve | 3.0 | 4.0 | 4.0 | 4.0 |
| Water | 46.9 | 59.9 | 37.4 | 59.4 |
| Total | 100.0 | 100.0 | 100.0 | 100.0 |

[1] Dry solids basis.
[2] "Unirez 757"—an alcohol soluble maleic rosin derivative having a softening point 140-155—manufactured and distributed by Union Camp Corp./Chemicals, Jacksonville, Florida.

Pigment wetting and fineness of grind were determined by NPIRI Grindometer and recorded in actual grind gage fineness reading. Dry scuff and wet rub reaction were measured with a Sutherland Rub Tester using ink draw down on Kraft stock and rubbing with bleached Kraft Stock. The dry scuff was measured by rubbing dry with a four pound load for ten cycles and wet rub test consists of placing 4 drops of water on the ink draw down and rubbing the liner based surface using a seven pound weight with bleached Kraft Stock. Ink transfer characteristics were examined using an Anilox Hard Proofer. Color strength was determined by tinting out the full strength ink with bleached tint prepared by grinding 35–40% titanium dioxide pigments with a 25% solids solution of shellac. Gloss ratings were visual. Wet bleed data was determined by placing a water saturated blotter stock on a liner broad draw down and two pound weight placed on the blotter for two minutes. Any color transfer to the blotter in wet bleed test after two minutes interval is deemed unacceptable. The following Table 1 illustrates the test results on Inks E–H.

TABLE 1

| Test | Ink E | Ink F | Ink G | Ink H |
|---|---|---|---|---|
| pH | 8.0 | 7.8 | 7.4 | 7.7 |
| Initial viscosity: | | | | |
|   #3 cup | 46 | 55 | 60 | 55 |
|   #2 cup | 28 | 29 | 28 | 32 |
| Aged ink viscosity | 29 | 34 | 29 | 34 |
| Grind fineness | 3 | 3 | 3 | 3 |
| Wet rub | (1) | (1) | (1) | (1) |
| Dry scuff | (1) | (1) | (1) | (1) |
| Gloss | (1) | (1) | (1) | (1) |
| Color strength | (1) | (1) | (1) | (2) |
| Wet bleed | None | None | None | None |

[1] Excellent. [2] Good.

In order to ascertain compatability of the hydrophilic morpholide polymers with the cobinders employed in Inks E–H, a film of the entire vehicle prior to pigmentation was cast on a glass plate and dried with ambient conditions. The resultant film indicated that the polymer was compatible in both the maleic rosin derivatives and shellac formulations. Initial grind appearance for Inks E, F, A and H respectively indicated good flow and moderate body, good flow and thin body, heavy body slight flow, and good flow and thin body. Ink viscosity measurements at room temperature were determined employing No. 2 and No. 3 Zahn cup (seconds recorded to employ cup filled with ink) as well as after 7 day storing (No. 2 Zahn cup) thereof at room temperature.

EXAMPLE IV

A hydrophilic amide interpolymer was prepared in complete accordance with Example I excepting for the use of 6.0 parts by weight 2-mercaptoethanol in the "A" Feed. This resulted in a significant increase in the interpolymer $\bar{A}_w$ value without adversely effecting its $\bar{A}_w/\bar{A}_n$ ratio. The viscosity at 35% and 25% solids was 4,350 cps. and 20.5 cps. Initial and aged ink viscosities readings were identical (per Example II test–38 No. 2 Zahn cup/sec.).

EXAMPLE V

The aqueous medium containing the hydrophilic amide polymer of Example IV was utilized in preparing a Bronz Powder Ink formulation (Ink I) and a fluorescent ink (Ink J). For comparative purposes, ink formulations having a corresponding initial viscosity were prepared utilizing a low molecular weight copolymer (approximately 70% styrene and 30% acrylic acid) in an aqueous ammonical medium. Parts by weight of the ingredients used in formulating the inks are as follows:

| Ingredients, parts by weight | Bronze powder inks | | Fluorescent inks | |
|---|---|---|---|---|
| | Ink I | Ink K | Ink J | Ink L |
| Hydrophilic morpholide polymer | 51.5 | | 63.0 | |
| Styrene-acrylic polymer | | 33.0 | 0 | 30.0 |
| Water | 29.0 | 10.5 | 3.0 | 36.0 |
| Bronze powder [1] | 38.0 | 38.0 | 0 | |
| Antifoam | 0.1 | 0.1 | 0.1 | 0.1 |
| Fluorescent pigment (LF-2713) | | | 34.0 | 34.0 |
| Total | 100.1 | 100.1 | 100.1 | 100.1 |

[1] 10 50:50 blend of pale gold and rich gold pigment.

The bronze inks (i.e., Inks I and K) were formulated to give equal viscosities when finished (22 sec. #2 Zahn cup) and were prepared by mild agitation of the ingredients for 30 minutes. Inks I and K respectively had a resin solids level of 9.8 and 18.0%. The fluorescent inks were fully ground in glass containers using ⅛" steel balls and a grinding time of 15 minutes in a conventional paint shaker.

Draw downs of the metallic pigment formulations (i.e., Inks I and K) indicated Ink I provided a brighter, smoother and better gloss than Ink K. Superior covering power was also observed with Ink I with two layers of Ink K being required to provide a comparable covering power. No gelation was observed in Inks I and K after ten days aging. After aging Ink K had a greater tendency to settle out with rapid sedimentation thereof being observed upon re-stirring of aged Ink K.

The comparative test results between Inks J and L were similar to those observed with the metallic Inks I and K above. The necessary low resin solids of Ink L to provide a useable viscosity results in faster and harder pigment settling. Due to the high pigment to binder ratio in Ink L, the formulation tended to rapidly settle out which in turn caused poor printing. Reformulation of Ink L to a higher resin solids level resulted in significantly lower color strength. Although the pigment in Ink J did settle, the process was slower and pigment packing was less, making it easier to remix the ink after aging. Printing characteristics of Ink J were significantly superior over Ink L. Improved color strength can be achieved by increasing the pigment solids to about 40–45% in Ink J. Inks K and L were deemed to have exceeded the maximum pigment concentration whereas functionality of the hydrophilic amide polymers in Inks I and J afforded further pigment loading without adversely affecting overall performance. Similarly, inks containing other metal pigment particles and fluorescent substrates (e.g., see pages 2744–2755, Handbook of Chem. and Physics, 37th Edition) can also be prepared.

EXAMPLE VI

This example illustrates improved wet rub resistance by employing a crosslinking resin as an ink formulation additive. The pigment portions of the inks consisted of 8 parts by weight molybdenum orange OT–1400 and 3 parts by weight Barium Lithol RT 2686. The basic formulation for each ink comprised the following parts by weight: pigment 27.5, 100 vehicle (35% solids of the hydrophilic amide polymer aqueous medium per Example I, Defoamer 10 (10% active), wax compounds 1.5 and 5.0 denatured ethanol. The resultant ink formulations were ground with a conventional paint shaker. The control ink (Ink M) contained the basic formulation mentioned above with Inks N, O and P respectively containing as an additive 1%, 3%, and 5% by weight "Scriptset 101 [4]."

Ink draw downs were made on coated light weight board for each ink sample using a No. 5 wire wound rod. Curing or drying cycles were 2 and 4 minutes at 70° C. and 90° C. Each cured ink was wet scrubbed manually using a blank board against the ink draw down board. Comparative data on the wet rub resistance of inks is tableted in Table 2.

TABLE 2

| Ink | Time, min. | Temp., °C. | Rating of wet end resistance |
|---|---|---|---|
| M | 2 | 70 | V. poor—heavy bleed. |
| | 4 | 70 | Sl. poor—med. bleed. |
| | 2 | 90 | Sl. poor—med. bleed of color. |
| | 4 | 90 | Fair—light bleed of color. |
| N | 2 | 70 | Fair—light bleed of color. |
| | 4 | 70 | Do. |
| | 2 | 90 | Good—v. light bleed of color. |
| | 4 | 90 | Do. |
| O | 2 | 70 | Good—v. light bleed of color. |
| | 4 | 70 | Do. |
| | 2 | 90 | V. good—no color bleed. |
| | 4 | 90 | Do. |
| P | 2 | 70 | Good—v. light bleed of color. |
| | 4 | 70 | V. good—no color bleed. |
| | 2 | 90 | Do. |
| | 4 | 90 | Do. |

EXAMPLE VII

The aqueous medium containing the hydrophilic morpholide interpolymer of Example I was diluted with a sufficient amount of water to provide 25% by weight solids and employed as a protective coating. The diluted aqueous medium was applied with a number 5 wire wound rod to several lightweight, bleached liner paperboards and air dried under ambient conditions. The coated paperboards were then folded and creased to a 90° edge. No visible cracks were found.

Conventional overprint varnishes were prepared by adjusting the aqueous medium of Example I to an appropriate overprint viscosity. The overprint formulation was then applied by a flexographic printing press to a flexographic printed substrate and allowed to dry. The resultant overprint varnish exhibited excellent wet rub and scuff resistance as well as a high gloss. The resultant overprint films also had excellent resistance against cracking and had a smooth, even surface without concomitant pinholes.

Since many embodiments of this invention may be made and since many changes may be made in the embodiments described, the foregoing is to be interpreted as illustrative only and the invention is defined by the claims appended hereafter.

What is claimed is:

1. An aqueous composition having an alkaline pH and adapted to provide a polymeric film by drying under ambient conditions, said composition comprising a homogeneous mixture of water and a hydrophilic amide polymer in an amount sufficient to impart film forming properties to said composition, said polymer consisting essentially of polymerized units of:

(A) from about 5 to 20 parts by weight of a monoethylenically unsaturated monocarboxylic acid having from 3 to 12 carbon atoms inclusive, (B) a hard monomer of an alkyl ester of a lower alkyl acrylic acid in an amount ranging from about 50 to 100 parts by weight with the alkyl ester and lower alkyl groups having from 1 to 3 carbon atoms inclusive, (C) a hundred parts by weight of a soft alkyl ester of an alpha, beta-ethylenically unsaturated monocarboxylic acid wherein the alkyl esters have from 1 to 3 carbon atoms inclusive, with the proportion of monomers (A), (B) and (C) providing an average $T_g$ ranging from 35° C. to about 45° C. and the weight average molecular size of the polymeric chain is within the range of at least 500 to less than 5,000, said hydrophilic amide moieties being the

---

[4] A water soluble, melamine formaldehyde resin manufactured and distributed by Monsanto Company, 800 N. Lindberg Blvd., St. Louis, Mo.

reaction product between the monocarboxylic acid groups of the monoethylenically unsaturated acid and at least one amine selected from the group consisting of:

(I) 

and (II) 

wherein $R_1$ and $R_2$ of Formula I are a member selected from the group consisting of hydrogen, an alkylene group having at least one oxy ether group, an alkylene group having at least one divalent oxygen atom monovalently linked to a carbon atom and the remaining monovalent oxygen linkage thereof being contiguously attached to a nitrogen atom, a lower alkanol group having from 1 to 6 carbon atoms, a polyhydric alcohol, and the member represented by Formula II is a heterocyclic amine wherein $R_3$ is an alkylene member selected from the group consisting of an alkylene group having at least one oxy group, and an alkylene group containing at least one divalent oxygen atom monovalently linked to a carbon atom and the other monovalent oxygen of said divalent oxygen being contiguously attached to a nitrogen atom, said polymer being further characterized as containing a sufficient amount of hydrophilic amide groups to provide a water soluble polymer exhibiting a centrifuged polymer residue of less than 0.01 parts by weight when 37 parts by weight of said polymer is dissolved in 63 parts by weight water at 25° C. at a pH between 7.3 and 8.1 and the dissolved polymer is subjected to a centrifugal force of 35 g's for 60 minutes.

2. The composition according to claim 1 wherein the weight ratio of hydrophilic amide polymer to water is at least 1:3.

3. The composition according to claim 2 wherein the monocarboxylic acid is a lower acrylic acid wherein the alkyl group of said acid contains from 1 to 3 carbon atoms inclusive.

4. The composition according to claim 3 wherein the monocarboxylic acid is methacrylic acid.

5. The composition according to claim 4 containing from about 10 to 15 parts by weight monocarboxylic acid and about 65 to 85 parts by weight hard monomer.

6. The composition according to claim 2 wherein the polymerized monomers consist essentially of methyl acrylate, methyl methacrylate and methacrylic acid.

7. The composition according to claim 6 wherein the hydrophilic polymer is characterized as having an $\overline{A}_w$ value of molecular weight less than 2,500 and the $\overline{A}_w/\overline{A}_n$ factor of polymer chain is between 1 and 3.

8. The composition according to claim 6 wherein the hydrophilic amide moiety of the polymer consists essentially of a morpholide.

9. The composition according to claim 8 wherein the composition has a pH greater than 7.0 up to about 8.0.

10. The composition according to claim 9 wherein the polymer solids to water ratio ranges between at least 1:3 to about 2:3.

11. The composition according to claim 10 wherein the $\overline{A}_w$ is less than 2,000 and the $\overline{A}_w/\overline{A}_n$ value is between about 1.5 and 2.5.

12. In a color imparting composition comprised of an aqueous vehicle portion and a color imparting portion, the improvement which comprises an aqueous vehicle portion containing water as a principal solvent and a hydrophilic amide polymer in an amount sufficient to impart film forming properties to said composition upon evaporation of the solvent from said composition, said hydrophilic amide polymer consisting essentially of polymerized units of:

(A) from about 5 to 20 parts by weight of a monoethylenically unsaturated monocarboxylic acid having from 3 to 12 carbon atoms inclusive, (B) a hard monomer of an alkyl ester of a lower alkyl acrylic acid in an amount ranging from about 50 to 100 parts by weight with the alkyl ester and lower alkyl groups having from 1 to 3 carbon atoms inclusive, (C) a hundred parts by weight of a soft alkyl ester of an alpha, beta-ethylenically unsaturated monocarboxylic acid wherein the alkyl esters have from 1 to 3 carbon atoms inclusive, with the proportion of monomers (A), (B) and (C) providing an average Tg ranging from 35° C. to about 45° C., said hydrophilic amide moieties being the reaction product between the monocarboxylic acid groups of the monoethylenically unsaturated acid and at least one amine selected from the group consisting of:

(I) 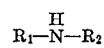

and (II) 

wherein $R_1$ and $R_2$ of Formula I are a member selected from the group consisting of hydrogen, an alkylene group having at least one oxy ether group, an alkylene group having at least one divalent oxygen atom monovalently linked to a carbon atom and the remaining monovalent oxygen linkage thereof being contiguously attached to a nitrogen atom, a lower alkanol group having from 1 to 6 carbon atoms, a polyhydric alcohol, and the member represented by Formula II is a heterocyclic amine wherein $R_3$ is an alkylene member selected from the group consisting of an alkylene group having at least one oxy group, and an alkylene group containing at least one divalent oxygen atom monovalently linked to a carbon atom and the other monovalent oxygen of said divalent oxygen being contiguously attached to a nitrogen atom, and the polymer has a weight average molecular size and an amount of hydrophilic amide groups sufficient to provide a water soluble polymer exhibiting a centrifugal polymer residue of less than 0.01 parts by weight when 37 parts by weight of said polymer is dissolved in 63 parts by weight water at 25° C. at a pH between 7.3 and 8.1 and the dissolved polymer is subjected to a centrifugal force of 35 g's for 60 minutes.

13. The composition according to claim 12 wherein the monoethylenically unsaturated monocarboxylic acid consists essentially of methacrylic acid.

14. The composition according to claim 13 wherein the amount of polymerized hard monomer units ranges from about 65 to about 85 parts by weight.

15. The composition according to claim 13 wherein the hard monomers and soft monomers consists essentially of methyl methacrylate and methyl acrylate.

16. The composition according to claim 12 wherein the composition has a pH between about 7.0 and about 8.0.

17. The composition according to claim 16 wherein the $\overline{A}_w$ is less than 2,500 and $\overline{A}_w$ to $\overline{A}_n$ ratio is between 3:2 and 5:2.

18. The composition according to claim 16 wherein the polymerized units consist essentially of methyl acrylate, about 65 to about 85 parts by weight methyl methacrylate and about 10 to about 15 parts by weight methacrylic acid, the $\overline{A}_w$ value is less than 2,000 and $\overline{A}_w/\overline{A}_n$ value is between 1.5 and 2.5.

19. The composition according to claim 18 wherein amide moiety of the polymer consists essentially of morpholide.

20. A printing ink composition according to claim 19.

21. The composition according to claim 18 wherein the composition is a flexographic printing ink.

22. The composition according to claim 12 wherein the interpolymerized monomeric units consist essentially of about 10 to 15 parts by weight methacrylic acid, about 65 to about 85 parts by weight methyl methacrylate and 100 parts by weight methyl acrylate and the amide moiety consists essentially of morpholide.

23. The composition according to claim 22 wherein the composition has an alkaline pH of greater than 7.0 and less than 8.5 and the alkali neutralizing agent consists essentially of an alkaline agent characterized as being volatile at 20° C. and atmospheric pressure.

24. A Flexographic ink composition according to claim 23.

25. The composition according to claim 23 wherein the color imparting agent consists essentially of a free metal pigment.

26. The composition according to claim 23 wherein the color imparting agent consists essentially of a fluorescent pigment.

27. In a method for providing an amide interpolymer comprising interpolymerizing monethylenically unsaturated monocarboxylic acid, hard and soft acrylate monomers under acidic emulsion polymerization conditions in the presence of a chain terminator and acylation of the interpolymer emulsions with a hydrophilic amine, the improvement which comprises:
(A) interpolymerizing under acidic, emulsion polymerization conditions:
(a) from about 5 to 20 parts by weight of a monoethylenically unsaturated monocarboxylic acid having from 3 to 12 carbon atoms inclusive,
(b) a hard monomer of an alkyl ester of a lower alkyl acrylic acid in an amout ranging from about 50 to 100 parts by weight with the alkyl ester and lower alkyl groups having from 1 to 3 carbon atoms inclusive,
(c) a hundred parts by weight of a soft alkyl ester of an alpha, beta-ethylenically unsaturated monocarboxylic acid wherein the alkyl esters have from 1 to 3 carbon atoms inclusive,
with the proportions of monomers (a), (b) and (c) providing an average interpolymer $T_g$ ranging from 35° C. to about 45° C. and the emulsion polymerization conditions being sufficient to provide an interpolymer characterized as having an $\bar{A}_w$ value ranging from at least 500 to less than 5,000 and $\bar{A}_w$ to $\bar{A}_n$ ratio between 1:1 and 3:1;
(B) admixing the interpolymer emulsion with a hydrophilic amine under mixing conditions sufficient to provide a homogenous mixture thereof,
(C) acylating *in situ* substantially all of the carboxylic acid moieties of the interpolymer in the homogeneous mixture, and
(D) adjusting the pH of the resultant homogeneous mixture containing the acylated interpolymer to a pH of between 7.4 and 8.2.

28. The method according to claim 27 wherein the hydrophilic amine is admixed with the interpolymer emulsion at a temperature less than 40° C. and the acylation reaction temperature is greater than about 50° C. and less than 75° C.

29. The method according to claim 27 wherein the hydrophilic amine is morpholine.

30. The method according to claim 29 wherein an ammonical solution is employed to adjust the pH between 7.5 and 8.0.

31. The method according to claim 30 wherein the $\bar{A}_w$ of the polymer is less than 2,000 and $\bar{A}_w/\bar{A}_n$ ranges from about 1.5 and 2.5.

References Cited

UNITED STATES PATENTS

| | | | |
|---|---|---|---|
| 3,057,812 | 10/1962 | Straughan et al. | 260—29.6 TA |
| 3,353,972 | 11/1967 | Sinclair | 260—29.6 ME |
| 3,367,893 | 2/1968 | Halbartschlager | 260—29.6 MN |
| 3,532,654 | 10/1970 | Finn et al. | 260—29.6 TA |

LUCILLE M. PHYNES, Primary Examiner

U.S. Cl. X.R.

106—22, 23; 117—155 UA, 161 UZ; 252—301.2 N; 260—29.6 N, 29.6 MN, 41 C, 27 R, 95 R

UNITED STATES PATENT OFFICE
CERTIFICATE OF CORRECTION

PATENT NO. : 3,825,514
DATED : July 23, 1975
INVENTOR(S) : Raymond L. Drury, Jr., James W. Hines, Charles S. Nevin It is certified that error appears in the above-identified patent and that said Letters Patent are hereby corrected as shown below:

Column 1, line 22, for "$(\bar{A}w)$" read ---$(\bar{A}_w)$---
Column 2, line 60, for "Py-(Z)" read ---$P_y - (Z)_n$---
Column 3, line 38, for "lipophilic" read ---lipophilic---
Column 4, line 64, for "of least" read ---of at least---
Column 5, line 50, for "surfact" read ---surface---
Column 6, line 63, for "modified" read ---modifier---
Column 8, line 5, for "corbon" read ---carbon---
Column 9, bridging lines 14/15, for "methyl, methyl" read ---ethyl, methyl---
Column 10, bridging lines 23/24, for "pigments will (e.g.,---) react" read ---pigments) will react---
Column 11, line 68, for "achieveing" read ---achieving---
Column 12, line 23, for "and and" read ---and an---
Column 13, line 16, for "Polymekon was" read ---Polymekon wax---
Column 13, line 26, for "initail" read ---initial---
Column 13, line 55, for "formultions" read ---formulations---
Column 14, line 33, for "1" read ---2---
Column 17, line 38, for "lower acrylic" read ---lower alkyl acrylic---
Column 18, line 40, for "centrifugal" read ---centrifuged---
Column 19, line 29, for "amout" read ---amount---

UNITED STATES PATENT OFFICE
CERTIFICATE OF CORRECTION

PATENT NO. : 3,825,514
DATED : July 23, 1974
INVENTOR(S) : Raymond L. Drury, Jr., James W. Hines and Charles S. Nevin It is certified that error appears in the above—identified patent and that said Letters Patent are hereby corrected as shown below:

Column 2, line 18, cancel "compatible" and substitute ---compatibility---
Column 2, line 54, cancel "25°" and substitute ---25°C.---
Column 3, line 54, cancel "useable" and substitute ---usable---
Column 11, line 54, cancel "155°C." and substitute ---155°F.---
Column 11, line 70, cancel "achieving" and substitute ---achievement---
Column 12, line 63, cancel "centrifuge" and substitute ---centrifuged---
Column 13, line 5, cancel "An ink formulation" and substitute ---Ink formulations---
Column 13, line 6, cancel "was" and substitute ---were---
Column 13, line 6, cancel "formulation" and substitute ---formulations---
Column 13, line 3 of table, cancel "solids" and substitute ---solids)---
Column 15, line 1, cancel "ammonical" and substitute ---ammoniacal---
Column 16, in Table 2, column 3, cancel "Rating of wet end resistance" and substitute ---Rating of wet rub resistance---

Signed and Sealed this second Day of December 1975

[SEAL]

Attest:

RUTH C. MASON
*Attesting Officer*

C. MARSHALL DANN
*Commissioner of Patents and Trademarks*